Feb. 12, 1963   J. A. GUFFRA   3,077,391
ATOMIZING DEVICE FOR CARBURETORS
Filed March 25, 1960   2 Sheets-Sheet 1

Joseph A. Guffra
INVENTOR.

Joseph A. Guffra
INVENTOR.

United States Patent Office 3,077,391
Patented Feb. 12, 1963

3,077,391
ATOMIZING DEVICE FOR CARBURETORS
Joseph A. Guffra, P.O. Box 493, Portola, Calif.
Filed Mar. 25, 1960, Ser. No. 17,604
11 Claims. (Cl. 48—180)

This invention relates to a novel and useful atomizing device for carburetors and more particularly relates to a device adapted to be interposed between the carburetor and the intake manifold of an internal combustion engine for the purpose of improving the performance of the engine by more completely vaporizing the mixture supplied thereto. Further, the atomizer device is specifically adapted to effect a high degree of turbulence of the fuel and air mixture whereby the volumetric efficiency of the engine will be greatly increased.

This is a continuation-in-part application of my copending application Serial No. 767,168, filed October 14, 1958, now abandoned, and entitled Atomizing Device for Carburetors.

Many methods and attachments have been devised for increasing the volumetric efficiency of an internal combustion engine including "tuned" passages in the intake manifold, wedge-shaped combustion chambers and other atomizing devices and the like specifically adapted to be interposed between the carburetor and the intake manifold of an internal combustion engine for effecting turbulence of the fuel and air mixture passing therethrough. The specially designated combustion chambers and intake manifold passages are of a nature requiring them to be formed as a part of the design of the internal combustion engine and therefore these methods cannot be conveniently applied to existing internal combustion engines which is not the case with atomizing devices adapted to be interposed between the carburetor and the intake manifold of an internal combustion engine. Further, these atomizing devices for causing turbulence of the fuel and air mixture passing therethrough can also greatly improve the volumetric efficiency of an engine equipped with specially designed intake manifold passages or combustion chambers.

Most of the atomizing devices heretofore designed to be interposed between the carburetor and the intake manifold of an internal combustion engine have either not been capable of effecting sufficient turbulence of the fuel and air mixture passing therethrough or may have greatly restricted the intake passages of the internal combustion engine thereby greatly reducing the "breathing" of the internal combustion engine.

The primary object of this invention is to provide a means for improving the operation and performance of an internal combustion engine by effecting a more complete vaporization of the fuel mixture and by increasing the volumetric efficiency of the engine without excessively restricting the intake passages of the internal combustion engine.

Another object of this invention is to provide a vaporizing attachment which will more completely vaporize the fuel mixture during its passage from the carburetor to the intake manifold of an internal combustion engine.

Still another object of this invention is to provide an attachment in accordance with the preceding objects which will improve the volumetric efficiency of the engine by providing a means by which the fuel mixture will be chilled before its introduction into the intake manifold of the engine.

A still further object of this invention is to provide a vaporizing attachment which will more completely vaporize the fuel mixture whereby the economy of operation and the smoothness of performance of the engine will be greatly enhanced.

An ancillary object is to provide an attachment in accordance with the preceding objects which may be installed between the carburetor and the intake manifold of conventional internal combustion engines without alterations to either the carburetor or the intake manifold and with a minimum requirement for skilled labor.

Yet another object of this invention is to provide an atomizing attachment having a more compact disposition longitudinally of the fuel passages whereby the change in position of the carburetor of an internal combustion engine relative to the intake manifold thereof will be slight.

A still further object of this invention is to provide an atomizing attachment including a plurality of plates with each plate being provided with a plurality of blades thereby enabling interchangeable relations of the plates to secure different relations of the blades and subsequent results therefrom.

Still another object of this invention is to provide a device having a blade assembly wherein the plurality of sets of blades are disposed in axially, radially and circumferentially spaced relation within the fuel mixture passage.

A further object of this invention is to provide an atomizing attachment which will provide means for swirling the combustible mixture passing therethrough about an axis extending axially through a fuel mixture passages and means for swirling the combustible mixture passing through the attachment subsequently about axes extending at right angles to the fuel passages.

A final object to be specifically enumerated herein is to provide a device in accordance with the preceding objects which will conform to conventional forms of manufacture and be of simple construction so as to provide a device that will be economically feasible and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
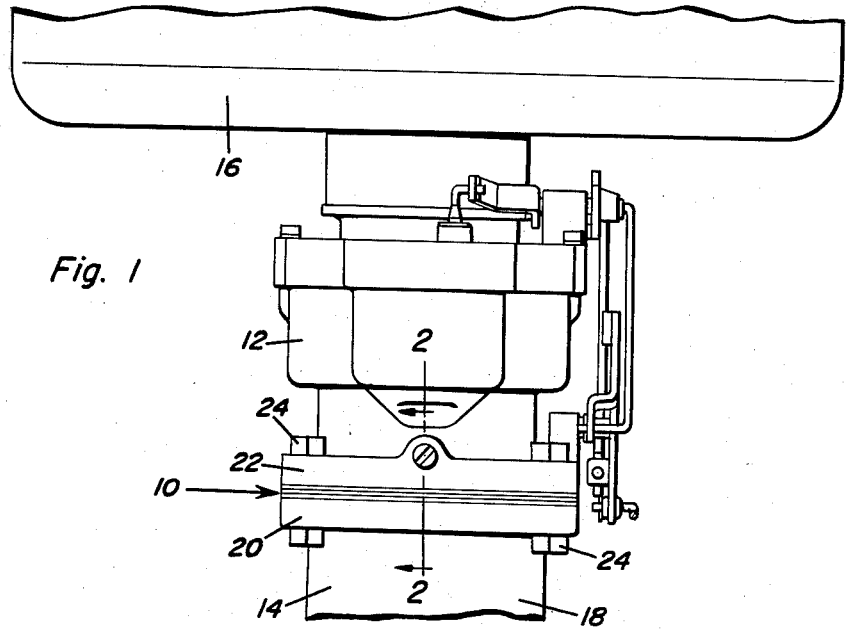
FIGURE 1 is a side elevational view of an attachment applied to an internal combustion engine carburetor and manifold assembly with the engine and parts of the intake manifold and air cleaner of the carburetor being broken away.

Referring now more specifically to the drawings the numeral 10 generally designates the atomizing device comprising the present invention which is shown in FIGURE 1 interposed between the carburetor 12 and the intake manifold 14 of an internal combustion engine (not shown). The carburetor 12 is of the conventional type and may be provided with an air cleaner 16 if it is desired. The intake manifold 14 is provided with a carburetor riser 18 with a coupling flange 20 secured to the upper end which is complementary to the carburetor mounting flange 22 carried by the base of the carburetor 12. The flanges 20 and 22 are each suitably apertured and the apertures formed therein are registerable and have fasteners 24 secured therethrough to removably secure the carburetor 12 to the intake manifold riser 18. The atomizing device 10 is disposed between the carburetor flange 22 and the intake manifold coupling flange 20 and is secured therebetween by means of fasteners 24 as will be hereinafter more fully set forth.

Figure 4:
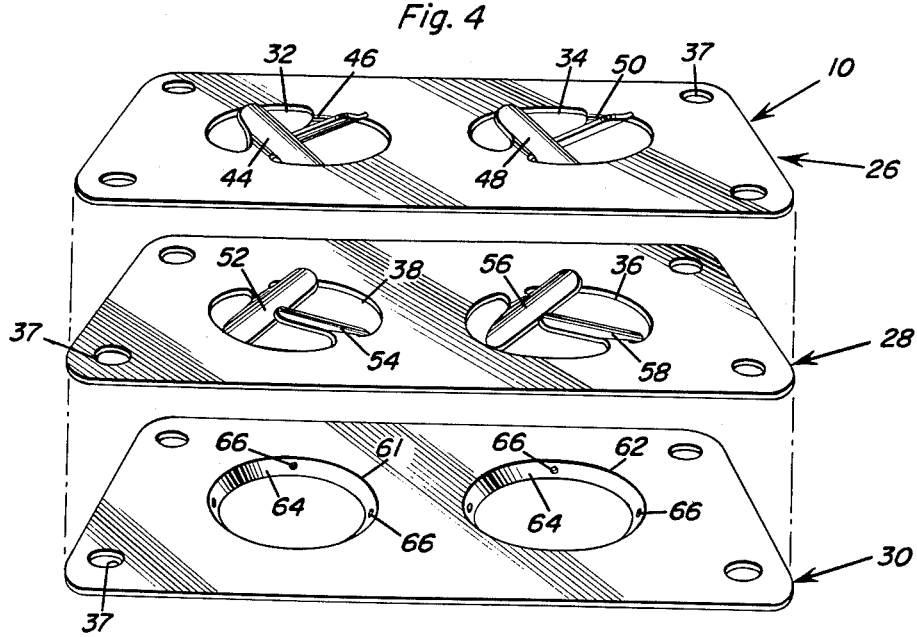
FIGURE 4 is an exploded perspective view of the atomizing attachment showing the manner in which the various plates comprising a part thereof may be assembled.

With attention now directed more particularly to FIGURE 4 of the drawing it will be noted that the atomizing device 10 is illustrated as comprising three plates generally designated by the reference numerals 26, 28, 30. The plates 26 and 28 are somewhat similar and therefore only one of these plates will be specifically described herein. Plate 26 has openings 32 and 34 formed therein which are complementary to openings 36 and 38 formed in plate 28. Openings 32 and 34 are registerable respectively with openings 38 and 36 and with the fuel and air mixture passages 40 and 42 in the carburetor 12. Each of the plates 26, 28 and 30 are suitably apertured at their corners as at 36 for receiving therethrough the shank portions (not shown) of the fasteners 24.

Openings 32, 34, 36 and 38 each have disposed therein a plurality of blades which are equally spaced circumferentially about the openings. For the purpose of simplicity of illustration each of the openings has only two blades disposed therein, but it is to be understood that any number of blades may be utilized if it is desired.

The plate 26 has blades 44 and 46 disposed in opening 32 and blades 48 and 50 disposed in opening 34. Plate 28 has blades 52 and 54 disposed in opening 38 and blades 56 and 58 disposed in opening 36.

Figure 3:
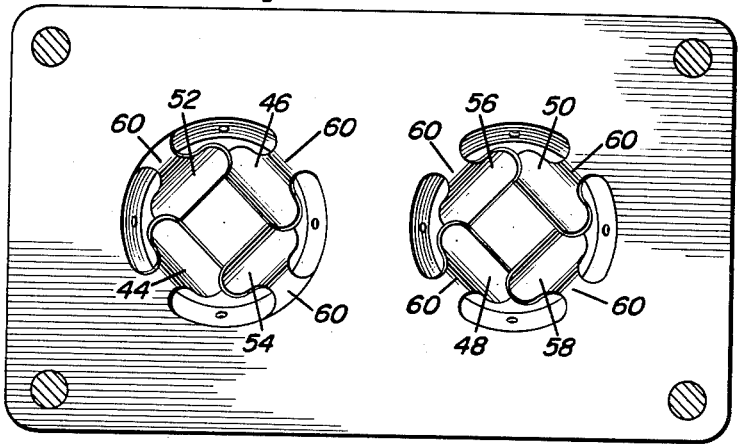
FIGURE 3 is a transverse horizontal sectional view taken substantially upon the plane indicated by the section line 3—3 of FIGURE 2.

Each of the blades is provided with a shank portion 60, see FIGURE 3, which extends radially of the corresponding opening and the shank portions 60 of the plate 28 are laterally offset slightly toward plate 26 and the shank portions 60 of plate 26 are laterally offset slightly toward plate 28. The laterally offset shank portions 60 position the median portions of the blades in a single plane which is parallel to the plates 26 and 28. The inner ends of each of the blades are laterally enlarged to define head portions. The laterally enlarged head portions are rotated about the longitudinal axis of the shank or stems 60 and it can be seen that by varying the position of the blades as to their inclined angle with respect to the plane containing their medial portions, that different reactions can be applied by the blades to the mixture passing through the openings 32, 34, 36 and 38 and therefore that different results can be realized. Further, the blades could also be positioned on shank portions or stems which do not lie on radii of the openings to thereby realize still different results. It can also be seen that the use of a plurality of plates and the construction of the device 10 enables the grouping of the blades to be of an overlapping nature thus enabling the blades to effect a more complete swirling or turbulent action to the fuel mixture passing through the openings. This improved turbulence and swirling action would not be possible with the use of a single plate if the relatively cheap stamping process were used for manufacturing the attachment.

It will be noted that the head portions of the blades are curved both longitudinally or traversely. The blades are also equally rotated on their stems 60 which lie on radii of the openings so that they form equal angles to the axes and the plane common to the axes about which they are rotated. Of course, unequal rotation of the blades or even opposite rotation of the same could be employed to achieve even still different results for treating the fuel mixture passing through the openings 32, 34, 36 and 38. Although the plates 26, 28 and 30 are illustrated in superposed abutting relation in the interest of securing as compact an insert adapter as possible, the invention also comprehends the provision of spacer plates between the plates 26, 28 and 30 in order to position the plates in spaced relation relative to each other to achieve still different results thereby.

Blades of each of the plates 26 and 28 are disposed in circumferentially spaced relation to those of the other plate when the two plates are disposed in superposed abutting relation so that the plates may be readily positioned in juxtaposed contiguous relation with the blades of the two plates in nested relation and with the head portions of the blades overlapping adjacent blades.

Inasmuch as the laterally enlarged head portions of the blades are rotated about the longitudinal axis of the stems 60, the opposite ends of each of the laterally enlarged head portions extend through the opening and project beyond both sides of the plate to which they are attached.

Inasmuch as the stems 60 of each plate 26 and 28 are laterally offset toward the other plate in order to position the medial portion of each of the laterally enlarged head portions of the blades of both plates 26 and 28 in a single plane, the extremities of the head portions of the blades project equal distance from the opposite sides of the plates 26 and 28.

With particular attention directed now more particularly to plate 30, it will be noted that it is provided with openings 61 and 62 which register with openings 32, 38 and 34 and 36 respectively. A hollow truncated cone shaped deflector 64 has its base edges secured to the periphery of each of the openings 61 and 62. The deflectors 64 extend away from the plates 26 and 28 as can be most clearly observed in FIGURE 2 of the drawings. Each of the deflectors 64 is provided with a plurality of circumferentially spaced apertures 66 which comprise by-pass means as will be hereinafter more fully set forth.

Figure 2:
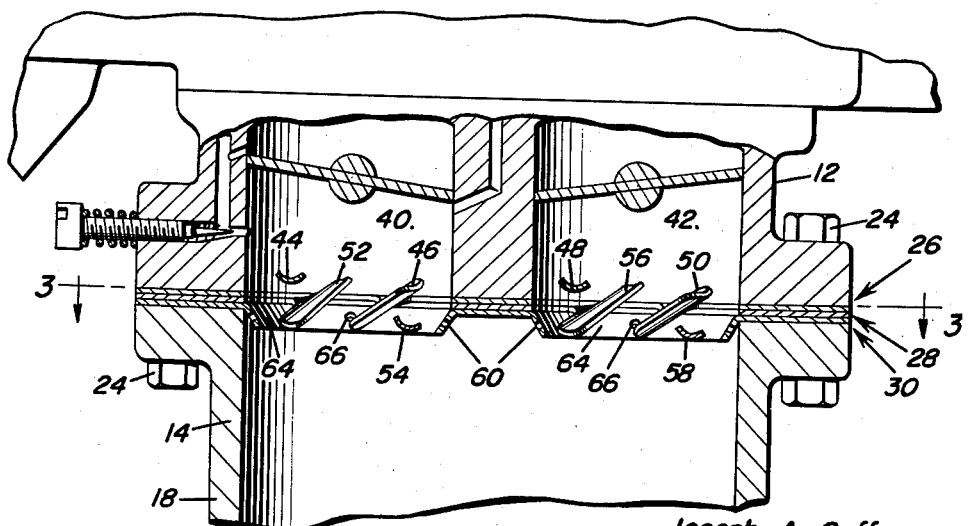
FIGURE 2 is an enlarged fragmentary vertical transverse sectional view taken substantially upon the plane indicated by the section line 2—2 of FIGURE 1.

With particular attention directed now to FIGURE 2 of the drawing it will be noted that the most compact mounting of the plates 26, 28 and 30 is that with the plates disposed in superposed abutting relation between the carburetor 12 and the intake manifold 14. As the fuel mixture passing through the passages 40 and 42 in the carburetor 12 strikes the blades of the plates 26 and 28 the fuel mixture is swirled about an axis extending longitudinally of the passageways 40 and 42. The fuel mixture then passes through the truncated deflectors 64 wherein a venturi effect is formed and the fuel and air mixture passing out of the deflectors 64 has a swirling motion imparted thereto about axes extending at right angles to the passages 40 and 42 by means of the lower lips of the deflectors 64. Portions of the fuel mixture swirled about axes extending at right angles to the fuel passages 40 and 42 then passes through the apertures 66 in the form of small jets projecting axially of the fuel passages 40 and 42. These jets of fuel mixture effect still further turbulence of the fuel and air mixture passing through the openings 32, 34, 36 and 38 and impinging upon the blades disposed therein effecting still further vaporization of the fuel and air mixture.

It is to be noted that the lower extremities of the blades are positioned so as to direct the fuel and air mixture impinging thereon at substantially right angles to the inclined surfaces of the deflectors 64 and slightly below the lower edge thereof. This positioning of the lower extremities of the blades greatly increases the amount of air and fuel mixture which is by-passed back through the apertures 66 in the form of small jets of the mixture extending radially of the fuel and air mixture passages 40 and 42.

By providing a device consisting of assembled component plates this invention obtained the advantage that each plate is susceptible to economical manufacture from a single sheet of material and by a single stamping operation. At the same time, the resultant structure produces a nested relation of blades and a swirling of the air and fuel mixture about perpendicularly disposed axes which could not be produced in a single plate by a stamping operation especially when it is desired to overlap the laterally enlarged head portions of the blades.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A charge forming device for increasing the volumetric efficiency and the volumetric charge of an internal combustion engine of the type having a carburetor and an intake manifold with complementary flanges thereon and comprising a plurality of plates disposed in side-by-side and surface-to-surface contacting relation with registering openings formed therein, means cooperating with said flanges and said plates, and securing the latter between said flanges with said openings in communication with said intake manifold and carburetor, means carried by some of said plates projecting inwardly of but terminating a spaced distance from the center of the openings therein for swirling the combustible mixture passing therethrough about an axis extending axially through said openings and means carried by at least one of said plates and projecting inwardly of the opening therein for swirling the combustible mixture passing therethrough about axes extending at right angles to said axially extending axis.

2. The combination of claim 1 wherein said means carried by said one plate includes reverse by-pass means for routing some of the combustible mixture treated thereby to be again treated by said one plate.

3. The combination of claim 1 wherein said by-pass means includes means for directing jets of some of said once treated combustible mixture radially inwardly of the flow of combustible mixture to be treated by said one plate whereby still further swirling action is imparted to the combustible mixture without appreciably restricting the flow of said mixture through said openings.

4. The combination of claim 1 wherein said means carried by said one plate comprises hollow truncated cone-shaped deflectors secured at their base edges to the periphery of the openings formed in said one plate, said one plate disposed behind said some plates in the direction of flow of said mixture, and said deflectors projecting away from said some plates.

5. The combination of claim 1 wherein said means carried by said one plate comprises a hollow truncated cone-shaped deflector secured at its base edge to the periphery of the openings formed in said one plate, said one plate disposed behind said some plates in the direction of flow of said mixture, and said deflector projecting away from said some plates, said means carried by said one plate including reverse by-pass means for routing some of the combustible mixture treated thereby to be again treated by said one plate, said by-pass means including means for directing jets of some of said once treated combustible mixture radially inwardly of the flow of combustible mixture to be treated by said one plate whereby still further swirling action is imparted to the combustible mixture without appreciably restricting the flow of said mixture through said openings.

6. The combination of claim 5 wherein said means carried by said some plates includes a plurality of sets of blades, each set of blades being disposed in an opening in circumferentially spaced relation, each set of blades being carried by one of said some plates and extending into the opening of an adjacent plate, said blades having inwardly extending stems and with the inward extremity of said stems being transversely enlarged in the form of an elongated transversely extending head, said stems extending along radii of said openings, said heads projecting laterally from opposite sides of said stems, said heads being rotated upon said stems, the corresponding faces of said heads having longitudinally straight semi-cylindrical channels, wherein said sets of blades may be readily interdigitated with and lie between each other and may be nested together, said heads being spaced inwardly of said deflector and disposed out of axial registry therewith.

7. A charge forming device for increasing the volumetric efficiency and the volumetric charge of an internal combustion engine of the type having a carburetor and an intake manifold with complementary flanges thereon, said charge forming device comprising a plurality of plates with registering openings formed therein, a plurality of sets of blades, each set of blades being disposed in an opening in circumferentially spaced relation, each set of blades being carried by one of said plates and extending into the opening of an adjacent plate and means cooperating with the flanges in said plates securing the latter between said flanges with said openings in communication with said intake manifold and carburetor, the sets of blades of one of said plates being interposed with and spaced circumferentially about said openings relative to the blades of an adjacent bladed plate, said blades each having inwardly extending stems, the inward extremity of each of said stems being transversely enlarged in the form of an elongated transversely extending head, said heads projecting laterally from opposite sides of said stems and rotated upon said stems about the longitudinal axis of said stems.

8. An atomizing attachment for an internal combustion engine comprising a plurality of plates disposed in side by side relation with registering openings formed therein, a plurality of sets of blades, each set of blades being disposed in an opening in circumferentially spaced relation, each set of blades being carried by one of said plates and extending into the opening of an adjacent plate, the sets of blades of one of said plates being interposed with and spaced circumferentially about said openings relative to the blades of an adjacent bladed plate, the sets of blades of said plurality of plates being slightly laterally offset relative to the corresponding plate and disposed in a single plane extending parallel to said plates and disposed between the remote surfaces of said plates having said sets of blades, said blades having inwardly extending stems, the inward extremity of each of said stems being transversely enlarged in the form of an elongated transversely extending head, said heads projecting laterally from opposite sides of said stems and being rotated upon said stems about the longitudinal axis of said stems.

9. The combination of claim 8 wherein said stems extend generally along radii of the corresponding openings, said heads each having their opposite ends overlapping the adjacent ends of the adjacent heads in spaced relation thereto.

10. The combination of claim 9 wherein the corresponding faces of said heads have longitudinally straight general semi-cylindrical channels.

11. The combination of claim 7 wherein said blades have inwardly extending stems, the inward extremity of each of said stems being transversely enlarged in the form of an elongated transversely extending head, said stems extending along radii of said openings, said heads projecting laterally from opposite sides of said stems, said heads being rotated upon said stems, said heads each having their opposite ends overlapping the adjacent ends of the adjacent heads in spaced relation relative thereto, one of said plates being free of said blades and including a hollow truncated cone-shaped deflector secured at its base edge to the periphery of the opening formed in one plate, said one plate being disposed behind said plates with said blades in the direction of flow through said openings, said deflector projecting away from said bladed plates, said means carried by said one plate including reverse by-pass means for routing some of the combustible mixture treated thereby to again be treated by said one plate, said by-pass means including means for directing jets of some of said once treated combustible mixture radially inwardly of the flow of combustible mixture to be treated by said one plate whereby still further swirling action is imparted to the combustible mixture without appreciably restricting the flow of said mixture through said openings, said heads being spaced inwardly of said deflector and disposed out of axial registry therewith.

References Cited in the file of this patent
UNITED STATES PATENTS

| | | |
|---|---|---|
| 1,231,939 | Reynolds | July 3, 1917 |
| 1,484,235 | Raba | Feb. 19, 1924 |
| 1,532,054 | Horton | Mar. 31, 1925 |
| 1,551,633 | Bennett | Sept. 1, 1925 |
| 1,937,875 | Denman | Dec. 5, 1933 |